(No Model.) 4 Sheets—Sheet 1.
T. F. ROWLAND & W. E. HILL.
CORRUGATING MACHINE.
No. 379,985. Patented Mar. 27, 1888.
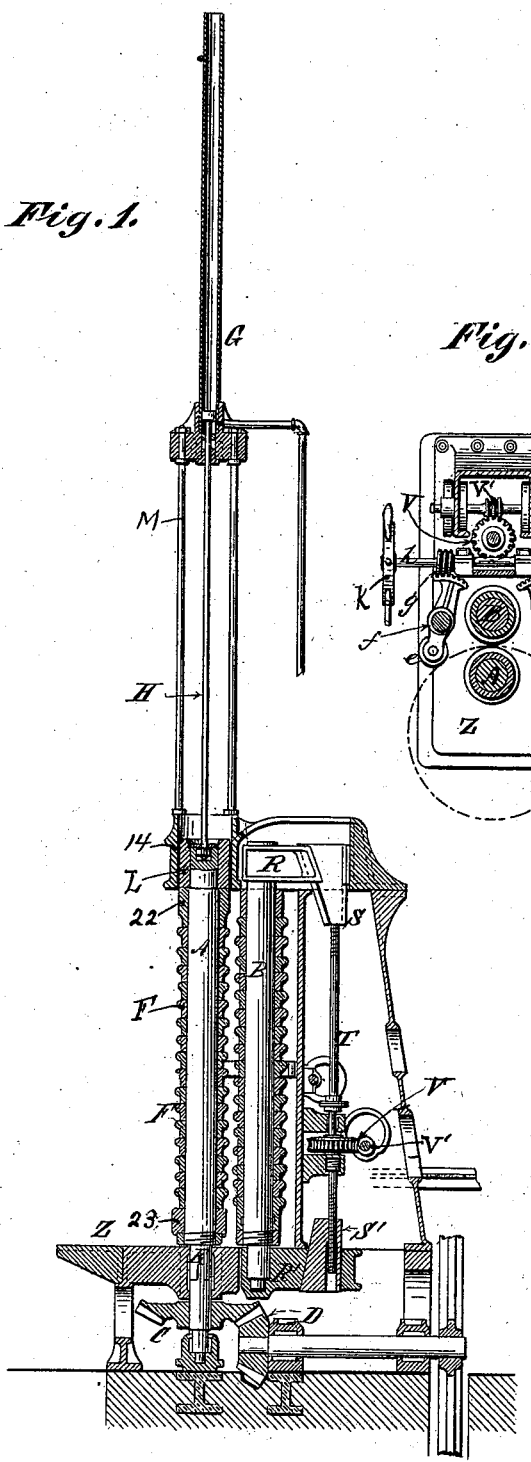
Fig. 1.
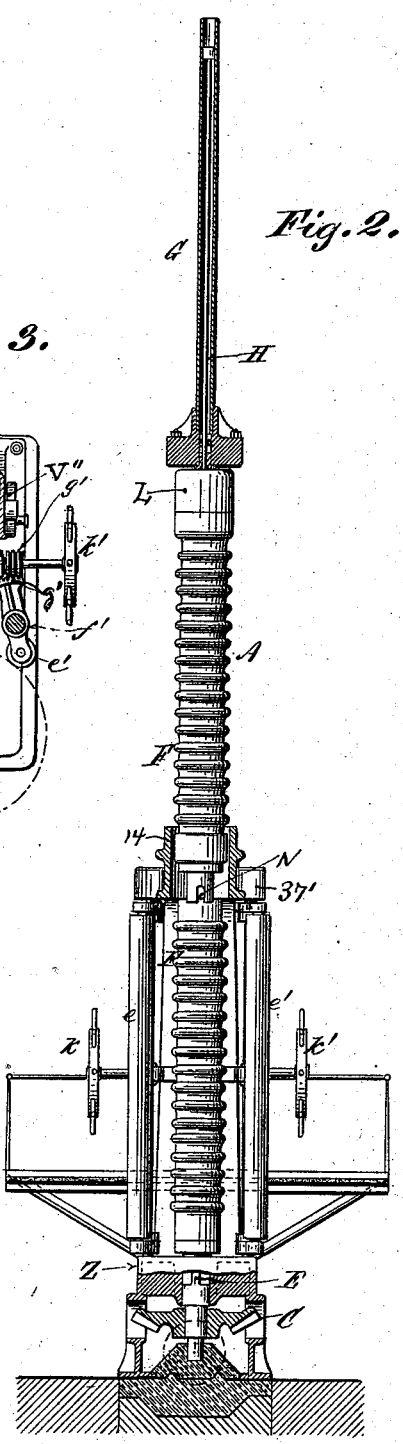
Fig. 2.
Fig. 3.

(No Model.) 4 Sheets—Sheet 2.
T. F. ROWLAND & W. E. HILL.
CORRUGATING MACHINE.
No. 379,985. Patented Mar. 27, 1888.
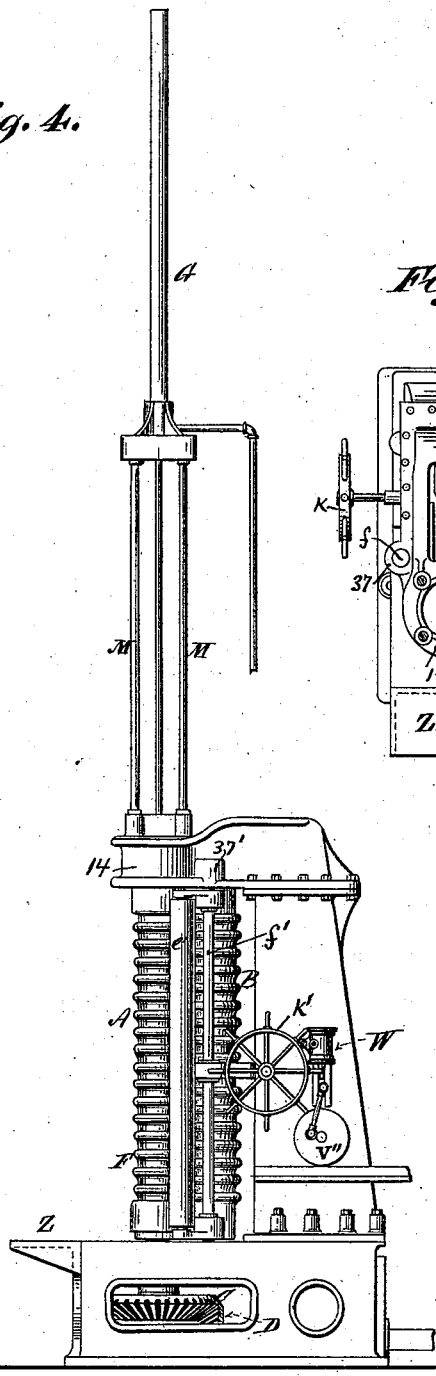
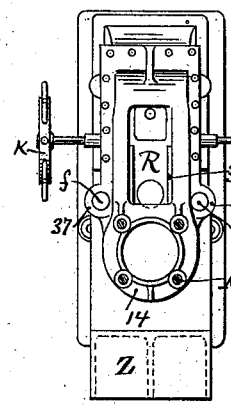
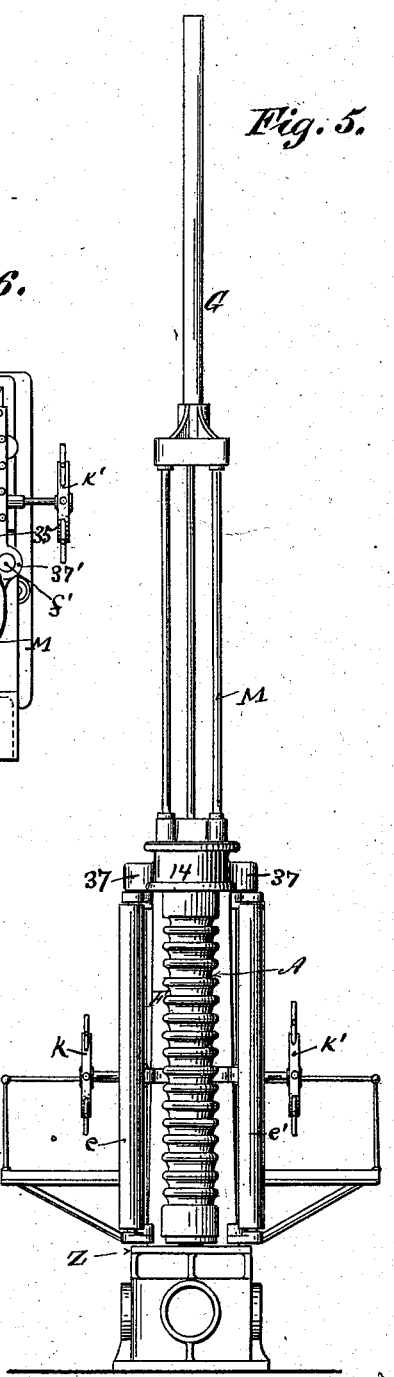

(No Model.) 4 Sheets—Sheet 3.
T. F. ROWLAND & W. E. HILL.
CORRUGATING MACHINE.
No. 379,985. Patented Mar. 27, 1888.
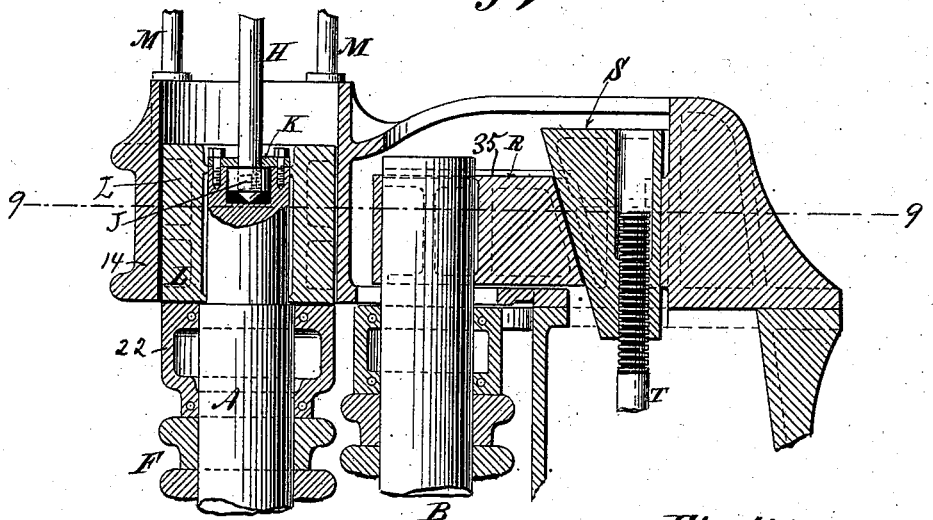

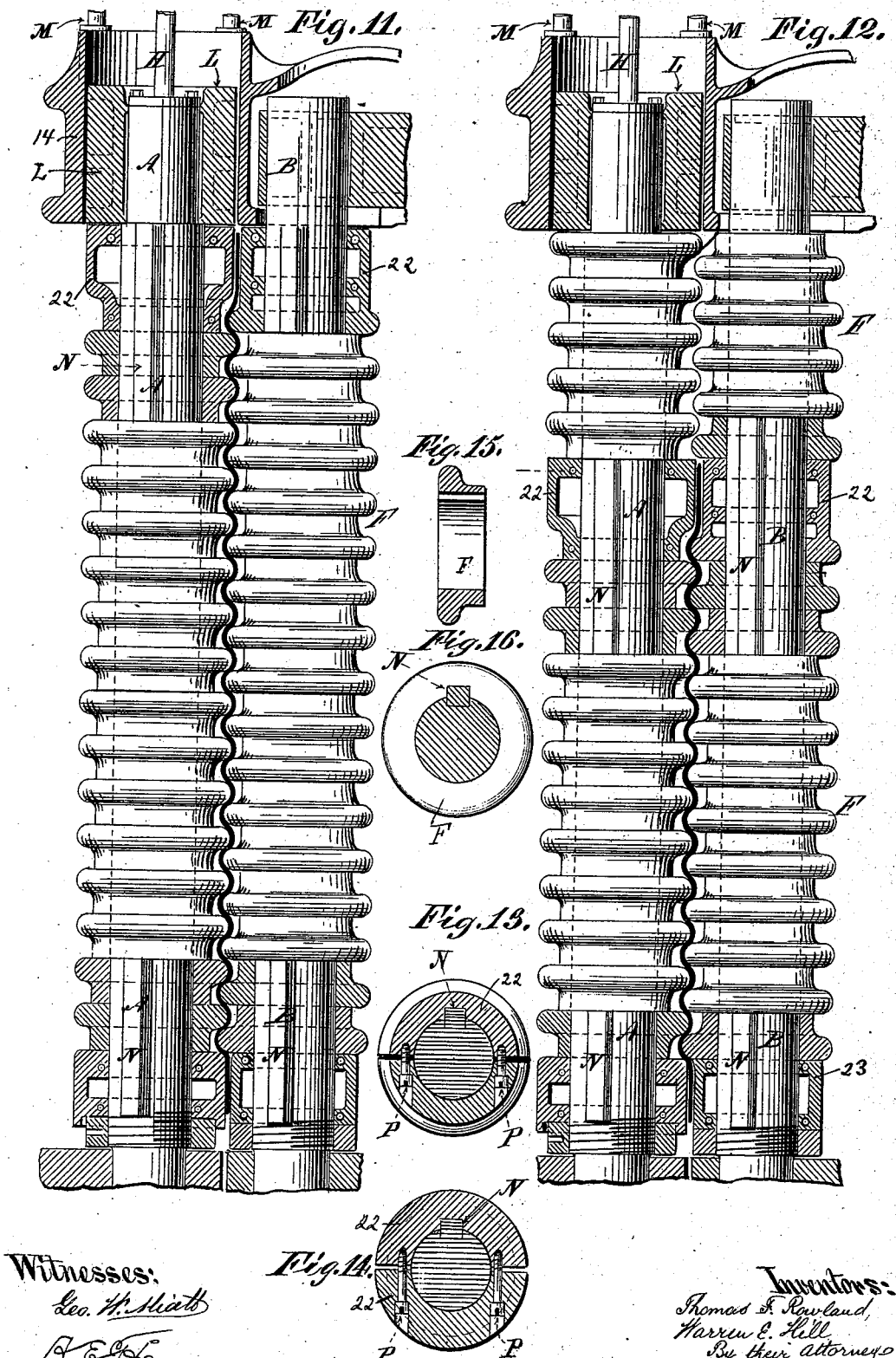

UNITED STATES PATENT OFFICE.

THOMAS F. ROWLAND, OF NEW YORK, AND WARREN E. HILL, OF BROOKLYN, NEW YORK; SAID HILL ASSIGNOR TO SAID ROWLAND.

CORRUGATING-MACHINE.

SPECIFICATION forming part of Letters Patent No. 379,985, dated March 27, 1888.

Application filed April 21, 1887. Serial No. 235,691. (No model.)

*To all whom it may concern:*

Be it known that we, THOMAS F. ROWLAND, of the city, county, and State of New York, and WARREN E. HILL, of Brooklyn, Kings county, New York, have invented a new and useful Improvement in Corrugating-Machines, of which the following is a full, true, and complete description, reference being had to the accompanying drawings.

This invention relates to an improvement in machines for corrugating cylinders. The cylinder is first made in any suitable way, then heated to a proper temperature to be worked by the corrugating-mill, and is then corrugated in the machine which is herein described. The heating of the cylinder should be done in a vertical furnace, preferably below the level of the corrugating-mill, so that it can be quickly picked up by a derrick or suitable contrivance and placed upon the corrugating-mill.

Our machine consists, generally, of two vertical rolls, one of which can be picked up vertically, so as to permit of the placing of the cylinder between the two rolls. The other roll can be adjusted up to and away from the first roll.

That which is new in our invention is claimed in the claims annexed to the present specification.

In the drawings similar letters refer to similar parts.

Figure 1 represents a cross-section through the two rolls; Fig. 2, an end elevation showing the driving-roll lifted; Fig. 3, a plan view, partly in section, showing the means of adjusting the centralizing guide-rolls. Fig. 4 represents a side view of our mill and the mechanism for moving the idle-roll toward the driving-roll. Fig. 5 represents a front elevation of our machine. Fig. 6 represents a top view showing the platen on which the bottom of the cylinder rests. Fig. 7 represents a view of the upper bearings of the rolls mostly in section, and also a view of the wedge-adjustment. Fig. 8 represents a detail of the wedge-adjustment. Fig. 9 represents a plan view of the top of the frame of the machine, the upper half in section on the line 9 9, Fig. 7; Fig. 10, a detail of the wedge-adjusting mechanism; Fig. 11, an enlarged view of the rolls, showing the cylinder in process of corrugation; Fig. 12, an enlarged view of the rolls, showing the means of rolling a shorter cylinder; Figs. 13 and 14, details of the adjustable spools on the rolls; Fig. 15, a view of a single spool; Fig. 16, the means of locking the spools on the shaft.

Our mill consists, generally, of a suitable support for the parts, which need not be described in detail, but may be of any proper construction. It consists, essentially, of a driving-roll, A, and an idle-roll, B. The driving-roll A can be picked up vertically to allow of the insertion of the cylinder. The idle-roll B can be adjusted nearer to or farther from the roll A by mechanism to be described. Both of the rolls are provided with corrugating-spools F, hereinafter to be more fully described. The driving-roll A is driven by the miter-gear D C. The bevel-gear C is firmly stepped in the machine, as shown, and the upper end of its shaft is provided with a transverse rib, E. The roll A has a transverse channel, N, corresponding to the rib E, cut in its lower end, so as to fit the said rib, whereby the roll A is driven when it is lowered. The roll A is raised by the fluid in the hydraulic cylinder G. The piston-rod H of this hydraulic cylinder is pointed at its lower end, as shown in Fig. 7, and is provided with a nut, J, which rests in a circular cavity in the top of the roll A. This cavity or chamber is closed by the plate K. In this way whenever the piston-rod H is pressed upward by the fluid in the hydraulic cylinder the roll A is elevated. When the water-pressure is taken away, the piston-rod H drops, so that its point rests on the upper end of the roll A, and that roll will then revolve without revolving the piston-rod H. If the piston-rod H revolved with the roll, the packing of the cylinder G might be injured. The upper end of the roll A rests in the cylindrical bearing L, which is of larger diameter than the roll itself, and which is carried in the upper frame, 14, of the mill. This frame likewise carries the posts M M M, which carry the hydraulic cylinder G. This bearing L is intended to be stationary in the frame of the machine, while the roller A revolves within it, as shown. Both the rollers A and B are provided with longitudinal splines N, and the spools F are provided with slots fitting the splines, so as to revolve with the rolls A and B. The top and bottom spools are not of the same shape as the intermediate spools, being adapted to roll the cylindrical ends of a furnace or tube, while the middle is corrugated.

It is sometimes important to roll a cylinder less than the entire length of the machine. In this case, were it not for our improvement, it would be necessary to unship the cylindrical spools 22 and remove a sufficient number of the corrugating-spools and replace the cylindrical spools upon each roll, and then replace above them the corrugating spools. In order to avoid this we have constructed the two upper cylindrical spools as shown in section in Figs. 13 and 14. They are constructed in two parts adapted to be drawn together by bolts P, the heads of which are of course countersunk within the circumference of the rolls. When it is desired to corrugate a shorter cylinder, the bolts P are removed and then the cylindrical spools. A sufficient number of the corrugating-spools F are then raised without unshipping, and the divided cylindrical spool is placed in position below them, as is plainly seen by comparing Figs. 11 and 12. The lower spools, 23, are likewise made separable. The utility of this method of dividing the upper and lower cylindrical spools, in addition to enabling the operator to corrugate cylinders of different lengths, also enables him to make tubular ends of different diameters. For instance, by reversing the lower spools it will be observed that the lower cylindrical end of the cylinder in process of corrugation will be made less in diameter than it is in the form shown.

The idle-roll B is caused to approach the driving-roll A by the mechanism shown in detail in Figs. 1, 7, 8, 9, and 10. It is carried top and bottom in two sliding bearings, R and R', which bearings slide in ways 35 in the frame of the machine. These bearings are controlled by the wedges S and S' at the top and bottom of the roll. The wedges are controlled by the right and left hand screw T, which is itself revolved by the worm-wheels V V', driving-wheel V'', and engine W. The wedges S S' are constructed alike and operate alike, but are reversed in their movement. The wedge S is provided with projecting lips $a$ $b$. The lip $b$ engages under the guide $c$ in the frame, and the lip $a$ beneath the guides $d$ in the moving bearing. Both ends of the idle-roll B are thus horizontally caused to approach and recede from the driving-roll A by the operation of the engine W. It is essential likewise to centralize the cylinder while being corrugated, so that it will not get out of true. This is accomplished by the adjustable centralizing-rolls $e$ $e'$. They are pivoted at $ff'$, as shown, and have gears on their outer extremities gearing into the worm-wheels $g$ $g'$, which are turned by the same shaft, $h$, having wheels $k$ $k'$. The pivots $ff'$ are journaled in bearings 37 37'. The worms are right and left hand, as shown, thereby simultaneously moving the guide-rolls $e$ $e'$ toward the cylinder.

The operation of our apparatus can now be readily understood. The roll A is lifted by the hydraulic cylinder G. The roll B is withdrawn by the engine. The rolls $e$ $e'$ are withdrawn by the hand-wheels $k$ $k'$. The cylinder, which has been heated, by preference, in a pit below the level of the rolling-mill, is lifted and set on the platform Z so that one side will lie between the rolls A and B when the roll A is lowered. The roll A is then lowered, the bevel-gear C D set in operation, the roll is centralized by bringing the wheels $e$ $e'$ to the position shown in Fig. 3, and the rolls are then caused to approach each other by the operation of the engine W. Corrugation ensues, as shown in Figs. 11 and 12. During this operation the diameter of the cylinder is slightly increased and the rolls $e$ $e'$ are withdrawn in order to allow for such increased diameter. In case a shorter cylinder is to be corrugated the spools are first adjusted to a suitable position, as is shown in Fig. 12.

What we claim as our invention, and desire to secure by Letters Patent, is—

1. A corrugating mill which consists of two vertical rolls, one of which is adapted to be withdrawn vertically from the mill and the other of which is combined with mechanism by which its position may be adjusted with reference to the first roll, substantially as described.

2. The combination, in a corrugating-mill, of a roller provided with corrugating-spools and with divided cylindrical spools adapted to roll a cylindrical portion of the tube to be corrugated, and whereby said cylindrical spools may be withdrawn from the shaft without slipping them over the end of the shaft, substantially as described.

3. In a corrugating-mill, the combination of two rollers provided with corrugating-spools, and the double wedge mechanism shown for causing one of said rolls to approach and recede from the other, the said wedge being provided with lips which engage both with the sliding bearing in which the roll is pivoted and with the frame of the machine, whereby the said roll is forced by a positive motion to approach and recede from the fixed roll.

4. The combination, in a corrugating-mill, of a roller which passes through the supporting-platform, mechanism located beneath said platform for driving the roller, and mechanism for raising the driven roller vertically, so as to permit the introduction of the cylinder to be corrugated, substantially as described.

5. The combination, in a corrugating-mill, of an idle-roll and a driven roll carrying corrugating-spools, the said spools being provided with slots and the said roller-shaft with a feather for preventing the revolution of the spools, one or more of said spools being divided, so that they may be removed and replaced upon the roll, substantially as described.

6. The combination of the roller B, carried in the sliding bearings at its extremities, the wedges S S', right and left hand screw T, and mechanism for revolving the same, substantially as described.

7. The combination of the roller-shaft, the corrugating-spools F, and the divided cylindrical spools bolted together by bolts P, as shown, substantially as described.

8. The combination, in a corrugating-mill, of the mechanism for causing the movement of one roll toward and away from the other, which consists of a wedge having lips at either side engaging with corresponding lips in a sliding bearing and fixed frame, substantially as described.

9. The combination of the roll A, lifter G H, and locking device E, means for driving said roll A, and the idle-roll B, substantially as described.

10. The combination of the lifter G, means for operating said lifter G, lifting-rod H, mechanism for permitting the revolution of the roll A without revolving the rod H, a fixed roll, B, and mechanism for revolving the roll A, substantially as described.

In testimony whereof we have signed our names to this specification in the presence of two subscribing witnesses.

THOMAS F. ROWLAND.
WARREN E. HILL.

Witnesses:
CHAS. F. HATHAWAY,
JAMES WILKINSON.